Feb. 8, 1966 M. BATOSTI ETAL 3,233,286
PROCESS AND APPARATUS FOR EXTRUDING
RIBBED PLASTIC MATERIAL SECTIONS
Filed Feb. 14, 1962

MARIO BATOSTI
ANTONIO BELLONI
INVENTORS

BY Tenner / Enstad

United States Patent Office 3,233,286
Patented Feb. 8, 1966

3,233,286
PROCESS AND APPARATUS FOR EXTRUDING RIBBED PLASTIC MATERIAL SECTIONS
Mario Batosti and Antonio Belloni, Milan, Italy, assignors, by mesne assignments, to Edison, Milan, Italy, a corporation of Italy
Filed Feb. 14, 1962, Ser. No. 173,217
Claims priority, application Italy, Feb. 16, 1961, 2,767
3 Claims. (Cl. 18—14)

The present invention relates to a process for the production of thermoplastic materials, e.g. polyvinylchloride, polyethylene, poylstyrene, cellulose acetate, etc., in sheet or tubular or other sectional form, by means of direct extrusion and with one or more ribs of variable cross-section in relief; more particularly, the present invention relates to the production of plastic tubular bag material provided longitudinally with said ribs.

An apparatus for providing said ribs also comes within the scope of the present invention.

It is known that plastic bags, after filling and stacking, have a natural tendency to slide which, in many easily imaginable cases, is a cause of serious trouble. This tendency to slide is due to the low frictional coefficient of the plastic material and the relatively small thickness thereof which does not give the wrapping sufficient rigidity such as that which obtains with paper bags; furthermore, on account of the generally powdery nature of the bag contents, the thinness of the extruded section facilitates the sliding of the filled bags.

An object of the present invention is therefore to provide on extruded sections, simultaneously with the extrusion thereof, suitably shaped ribs adapted in the first place to prevent the sliding of the bags stacked one on top of the other, and in the second place to constitute a strengthening for the extruded section itself.

Another object of the invention is to provide said ribs by using the usual extrusion dies so modified as not to impair the continuous flow of the molten material to be extruded, but so as to permit part of this extruded material to be used for forming said ribs during the extrusion process itself.

A further object of the invention is to provide ribs shaped in any manner and such as will not require subsequent working, thus providing manifest practical and economical advantages.

Finally, the extrusion process thus improved, together with the apparatus necessary to put same into effect, enables ribs which are variable both in size and cross-section to be obtained, without having to change tools, but merely by the regulation of valves provided for the purpose.

These and yet other objects which may appear more clearly in what follows, are attained by a process for the continuous extrusion of ribbed plastic sections, which process, according to the invention, is characterized in that it consists in taking part of the molten mass flowing through a die of known type, causing it to run in suitable conduits so as to make it assume a thread- or hand-like extension, and projecting said thread- or band-like mass directly, after regulating same, on to the extruded section at the immediate exit thereof from the die or, in any case, on to a zone of said extruded section which is still in the semi-molten state.

In order to carry out the process according to the invention an apparatus is employed which comprises an extrusion die in the outer terminal part whereof there is provided at least one conduit or passage, disposed diagonally in relation to the axis of the die and communicating hydraulically, through interposed control valves, with at least one other conduit or passage so inclined, in relation to the axis of the die, as to project the molten mass drawn from the inside of the die and channeled into said passages, directly on to the extruded section and preferably in the zone thereof which is immediately neighbouring the outlet mouth of the die.

A preferred but not exclusive embodiment of the invention will now be described in greater detail with reference to the accompanying drawing, which is given purely for illustrative purposes without limiting the invention, and wherein.

Figures 1, 2:
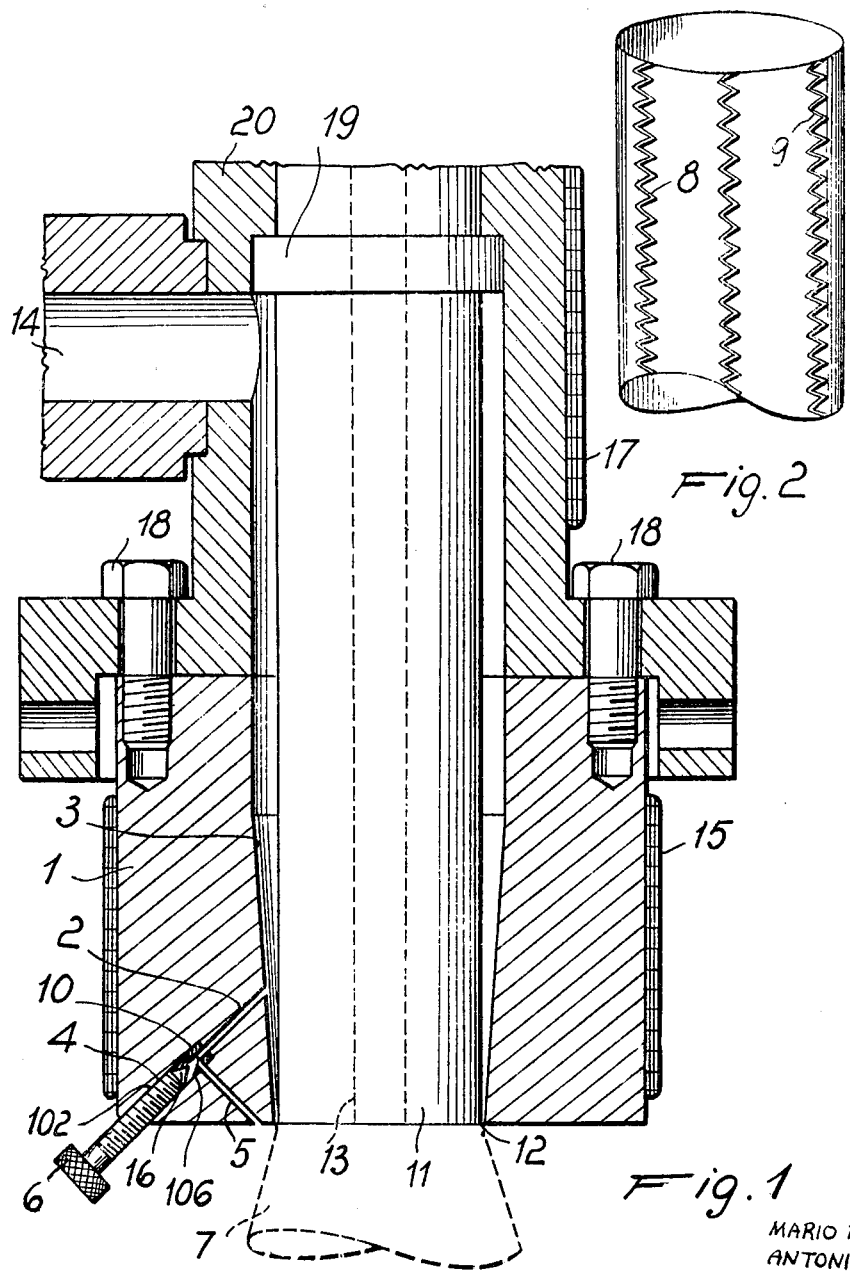
FIG. 1 is a longitudinal cross-section of an extrusion die for thermoplastic tubular sections, improved according to the invention.
FIG. 2 shows, on the other hand, a side view of a tubular section provided with ribs obtained by the process hereunder.

With reference to the drawing, the improved equipment according to the invention for the obtaining of ribs on extruded sections simultaneously with the extrusion thereof, consists of a usual die for tubular bodies, in whose outer portion 1 and preferably in the terminal portion of the die, there is pierced a conduit or passage 2, diagonally inclined (FIG. 1) to the longitudinal axis of the die and having a conical profile with the greater base or opening thereof communicating with the inner part 3 of the die.

The end of lesser diameter of conduit 2 communicates with a regulating valve 4 from which there branches out a conduit 5 having a smaller cross-section than that of the aforesaid conduit, and being in turn inclined in a direction opposed to that of conduit 2.

Conduits 2 and 5 are preferably disposed in an axial plane passing through the axis of the die.

Alternatively these conduits may be in the form of a single curved by pass conduit or passage.

In the shown embodiment the two conduits form between them an elbow enclosed by an appropriate tubular piece 106 inserted in a bore 102 wherein is lodged valve 4 formed with a valve point 16 co-operating with elbow passage 10 of the tubular piece 106.

The outlet end of conduit 5 comes out near the exit zone of the tubular section of the die.

The conical type regulating valve 4, clearly visible in FIG. 1, can be actuated from the outside by means of handwheel 6.

The inside of the die consists of the male member 11 defining together with the inner wall of member 1 the orifice 12 of the die wherethrough the plastic tubular section 7 is extruded. Male member 11 is formed with an axial passage 13 through which a blasting air current designed to improve the mechanical characteristics of tubular member 7 is passed, said tubular member being inflated by said blast. The softened extrusion material enters by neck 14 of the die, which is provided with non-metallic bands 15 and 17 which constitute the sheath resistance for heating the die. The female member 1 of the die is fixed onto the extrusion apparatus by means of screws 18, whilst the position of the male member 11 is determined by the mating of collar 19 in the housing provided for same in the die holder 20.

The formation of ribs on the sections extruded by the apparatus shown in FIG. 1, is based on the principle of withdrawing from zone 3 of the die some of the molten material and causing said material to reach the outside with a slant such that the product—in the form of a filament while passing through conduits 2 and 5 is suitably projected, as a consequence of the extrusion pressure of the die, on to the remaining molten mass immediately upon the exit thereof from the die, in such a manner as to obtain a cementing of said filament on to section 7, thereby obtaining a single ribbed section as in FIG. 2.

As may be seen in FIG. 2, ribs 8 and 9 follow a zig-zag course the profile whereof is particularly suitable, compared to rectilinear ribs, for improving the hold or grip of such bags as are filled and stacked one on another. The special zig-zag form of these ribs is due simply to the pressure to which the filament issuing from conduit 5 is subjected, said pressure, and also the quantity of material being channeled, being capable of regulation at will by means of valve 4.

In the shown embodiment the ribs consists of a string 8 or 9 of plastic material of circular cross-section (although they could have any other cross-section), disposed in the plane of the blown film of material and oscillating along a generatrix thereof.

The string is of variable thickness, but in the embodiment illustrated its thickness is 1–2 mm.

The zig-zag outline is due to the fact that the velocity of expulsion of the string 8 or 9 (which velocity can be adjusted by screw 6) is greater than that of the blown film 7, so that the richness (excess length) of the string causes same to be deposited (and hence cemented) along just such a zig-zag line. In order that this phenomenon may take place, it is essential that the relative output speed of the string (with constant cross-section) be slightly greater than that of the extruded blown film.

In the example shown, conduits 2 and 5 are circular (although they could have any other cross-section) and are disposed radially on the plane passing through the axis of the extruding head.

The inclination of bore 102 is such that the small valve 4 can easily be set in position and operated.

The inclination of passage 5 determines, within certain limits, the frequency of the zig-zag displacements.

The more said passage tends to be directed orthogonally to the blown tube the greater the frequency of the zig-zags; at the limit, however, no zig-zag effect occurs.

In order to obtain a higher velocity in the output nozzle of the string, it is necessary that the drop in pressure head in conduits 2 and 5 be less than that encountered by the tubular film in the terminal part of the extruding head, so that it is preferable to make a slightly tapering conduit with a small cross-section at the outlet mouth thereof.

If desired, the conduit could be cylindrical but provided with a throttled end or nozzle.

It is manifest that in practice the number of conduits for the projection of the molten filament on to the extruded section can vary at will or according to requirements; several angularly disposed conduits may in fact be provided around the circumference of the die so to obtain more than one rib over the whole outer surface of the tubular member or extruded section. While as an exemplificative embodiment a die has been described adapted for the extrusion of tubular sections, it will be obvious that the invention contemplates also the formation of ribs on sheet or foil material and is not limited by the shape or kind of the extruded material. Also, the by pass conduits of the die may be in the form of a by-pass slit through which a flat string in the form of a band, may be deposited and cemented on the extruded section to form the desired ribs. Furthermore, the slope of conduits 2 and 5, the type of valve employed, the type of section extruded and the type of die employed can be varied in any manner according to the exigencies without ever departing from the juridical scope of the invention as described and hereinafter claimed.

We claim:

1. An extrusion die comprising an outer member having an endless wall surrounding an inner cavity, an inner member positioned in said cavity and spaced from said endless wall to form an endless annular space therewith and said space terminating in a downwardly extruding orifice, means for delivering material to be extruded to said annular space for extrusion downwardly through said orifice, a first conduit connected to said annular space for receiving therefrom a portion of the material being extruded, a second conduit connected with said first conduit and conducting extruding material to a discharge conduit opening, a valve connected to said second conduit for regulating the rate of flow through said second conduit, said first and second conduits being fixed relative to said annular space, said discharge opening being spaced from the extruding orifice a distance substantially greater than the diameter of the second conduit and being arranged in proximity to the extruded material to deposit the material being discharged from the conduit onto the material being discharged from said extruding orifice, said conduits being of a diameter which will allow extruded material to be discharged downwardly at a faster linear rate from the conduit opening than the material being discharged from the extruding orifice to undulate the material from the conduit opening when being joined with the extruded material discharged from the extruding orifice.

2. An extrusion die having an annular passageway and a discharge orifice, means for delivering material to be extruded to said annular passageway for extrusion through said discharge orifice, a conduit connected at one end with said annular passageway and being fixed relative thereto and discharging the extruded material received from the annular passageway at the other end in a downward angular direction towards the material being extruded from said discharge orifice to join the same together, the cross sectional area of the conduit being sufficiently great to cause a linear rate of flow of extruding material, which is greater than the linear rate of flow of the extruded material flowing from the discharge orifice, said discharge orifice of said conduit being spaced from the discharge orifice of the said annular passageway a distance greater than the cross sectional area of said conduit to cause undulation in the material extruded from said conduit as it joins with the material from said annular passageway discharge orifice.

3. An extrusion apparatus comprising an outer die, having an inner cavity, an inner die fixedly mounted in said inner cavity to form an annular passageway between the outer and inner dies, a discharge annulus connected to said annular passageway through which extruded material is discharged, a conduit connected at one end to receive extruding material from said annular passageway and being fixed relative thereto and having a discharge orifice at the other end to discharge extruding material downwardly and in the direction of the material being extruded from the discharge annulus, said discharge orifice and duct being of a cross section which will permit the extruded material from the duct to flow at a faster rate than that from the discharge annulus, and said discharge orifice being spaced from the discharge annulus a distance greater than the diameter of the conduit passageway.

References Cited by the Examiner

FOREIGN PATENTS

| | | |
|---|---|---|
| 659,706 | 5/1938 | Germany. |
| 1,110,856 | 7/1961 | Germany. |

ROBERT F. WHITE, *Primary Examiner.*

MORRIS LIEBMAN, *Examiner.*